(12) United States Patent
Hall

(10) Patent No.: US 9,919,600 B2
(45) Date of Patent: Mar. 20, 2018

(54) VEHICLE INFORMATION DISPLAY SYSTEMS

(71) Applicant: Toyota Motor Engineering & Manufacturing North America, Inc., Erlanger, KY (US)

(72) Inventor: Jonathan C. Hall, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 91 days.

(21) Appl. No.: 15/055,548

(22) Filed: Feb. 27, 2016

(65) Prior Publication Data

US 2017/0246956 A1 Aug. 31, 2017

(51) Int. Cl.
*G02B 27/01* (2006.01)
*B60K 35/00* (2006.01)
*B60K 37/02* (2006.01)

(52) U.S. Cl.
CPC .......... *B60K 37/02* (2013.01); *G02B 27/0101* (2013.01); *B60K 2350/1068* (2013.01); *B60K 2350/2052* (2013.01); *G02B 2027/0141* (2013.01)

(58) Field of Classification Search
None
See application file for complete search history.

(56) References Cited

U.S. PATENT DOCUMENTS

| | | | |
|---|---|---|---|
| 3,885,095 A | 5/1975 | Wolfson et al. | |
| 6,100,943 A * | 8/2000 | Koide | B60K 37/02 345/7 |
| 6,639,569 B2 | 10/2003 | Kearns et al. | |
| 6,731,435 B1 | 5/2004 | Kormos et al. | |
| 7,525,734 B2 | 4/2009 | Aoki et al. | |
| 8,878,843 B2 | 11/2014 | Koga | |
| 2010/0127954 A1 | 5/2010 | Park et al. | |
| 2013/0027781 A1 | 1/2013 | Eckardt et al. | |
| 2014/0362448 A1 | 12/2014 | Yamada | |
| 2015/0268466 A1 * | 9/2015 | Kanamori | G02B 27/01 345/8 |
| 2017/0113551 A1 * | 4/2017 | Schaellert | B60K 35/00 |

* cited by examiner

*Primary Examiner* — Edward Martello
(74) *Attorney, Agent, or Firm* — Dinsmore & Shohl LLP

(57) ABSTRACT

A vehicle information display system and an instrument panel assembly configured to project vehicle information onto the windshield or on a meter panel is provided. The information display system and the instrument panel assembly utilizes a single electronic display to either display vehicle information on the meter panel or to project vehicle information onto the windshield so as to reduce the number of components needed to perform both functions, and thus reduce packaging space. The electronic display and a first panel are rotatably mounted to the first display opening so as to alternatively cover the first display opening, wherein in a first mode of operation the electronic display is disposed within the first display opening and in a second mode of operation the first panel is disposed within the opening and the vehicle information is projected onto the windshield.

20 Claims, 7 Drawing Sheets

VEHICLE INFORMATION DISPLAY SYSTEMS

TECHNICAL FIELD

The present specification generally relates to vehicle information display systems configured to display vehicle information on the windshield or on a meter panel.

BACKGROUND

Heads up displays in automotive vehicles provide the driver with the ability to view vehicle information while maintaining view of the road. The heads up display projects vehicle information on to the windshield. The vehicle information may include speed, distance to empty, travel directions or the like.

Currently, heads up displays are mounted to the instrument panel and may include a light source, a lens and a display. The components require a predetermined packaging space. However, such space competes with components configured to provide a visual display of vehicle information on the instrument panel.

In particular, current automotive vehicles may have an electronic display fixedly mounted to the dashboard of the instrument panel. The electronic display includes a panel configured to display a variety of vehicle information such as speed, distance to empty, trip information and the like. Further, the electronic display competes for space with other instruments such as a speedometer, tachometer and the like. Thus, the visual presentation may be limited by the inclusion of other instruments.

The inclusion of a heads up display may be difficult as the components of the heads up display compete with the components of the electronic display and other vehicle components for packaging space.

Accordingly, a need exists for an instrument panel assembly configured to accommodate both an electronic display on an instrument panel and a heads up display on a windshield which reduces the packaging space required relative to current systems with both features.

SUMMARY

In one embodiment, vehicle information display system for use in includes an electronic display and a head ups display unit. The vehicle information display system may be adapted for use in an instrument panel assembly. The instrument panel assembly includes a meter panel having a first display opening. The meter panel may be mounted behind a steering wheel.

The electronic display is configured to visually display vehicle information. The electronic display is rotatably mounted to the first display opening. A first panel is also rotatably mounted to the first display opening. A first drive system is mechanically coupled to the electronic display and the first panel. The first drive system positions the electronic display and the first panel so as to alternatively cover the first display opening.

The heads up display unit is configured to project the vehicle information shown by the electronic display onto the windshield. In a first mode of operation, the first drive system positions the electronic display so as to cover the first display opening and positions the first panel so as to be behind the electronic display. In a second mode of operation, the first drive system positions the first panel so as to cover the first display opening and the electronic display is positioned in communication with the heads up display unit so as to display the vehicle information onto the windshield.

In one embodiment, the heads up display unit includes a first mirror and a second mirror. The first mirror is positioned behind the meter panel and reflects the vehicle information from the electronic display onto the second mirror, when the vehicle information display system is in the second mode. The second mirror reflects the reflection for the first mirror onto the windshield.

In one embodiment, the heads up display unit includes a lens. The lens is configured to invert an image from the first second mirror so as to provide a corrected orientation of the vehicle information on the windshield. The lens may be disposed between the second mirror and a top panel of the instrument panel assembly.

In another embodiment, the heads up display includes an image processor and a controller. The image processor is configured to invert the vehicle information displayed on the electronic display unit. The controller actuates the first drive system so as to move the first panel and the electronic display between the first mode of operation and the second mode of operation. In the second mode of operation, the controller is further configured to actuate the image processor wherein the vehicle information displayed on the electronic display is inverted, and the inverted image is corrected by the first mirror and the second mirror so as to be in its original orientation when viewed on the windshield.

In one embodiment, an instrument panel assembly is configured to generate a heads up display on a windshield or provide a fixed visual display on a meter panel of the instrument panel assembly. The instrument panel assembly includes a meter panel having a first display opening. An electronic display and a first panel are both mounted to the first display opening. The electronic display is configured to visually display vehicle information. The first panel includes an outer surface having a fixed indicia.

The instrument panel assembly further includes a first drive system. The first drive system is configured to position the electronic display and the first panel so as to cover the first display opening. In particular, the first drive system is configured to position the electronic display so as to cover the first display opening and place the first panel behind the electronic display in one instance and position the first panel so as to cover the first display opening and place the electronic display behind the first panel in another instance. The instrument panel assembly further includes a heads up display unit. The heads up display unit is configured to project the vehicle information displayed by the electronic display onto the windshield.

The instrument panel is configured to operate in a first mode and a second mode. In a first mode of operation, the first drive system positions the electronic display so as to cover the first display opening and positions the first panel so as to be behind the electronic display and in a second mode of operation the first drive system positions the first panel so as to cover the first display opening and the electronic display is positioned in communication with the heads up display unit so as to display the vehicle information onto the windshield.

In one embodiment, the heads up display unit includes a first mirror, a second mirror, a lens and a light source. The light source is positioned behind the electronic display so as to project the vehicle information onto the first mirror. The first mirror is above the electronic display and tilted so as to reflect the vehicle information onto the second mirror. The second mirror receives the reflection from the first mirror and project the reflection on to the lens. The lens projects and enlarges the vehicle information onto the windshield.

Accordingly, the vehicle information display system is configured to provide both an electronic display of vehicle information on the meter panel and a heads up display of vehicle information on the windshield while minimizing packaging space relative to current instrument panel assemblies. Further, the vehicle information display system provides a larger image of the vehicle information on the windshield relative to the vehicle information shown on the electronic display.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Referring generally to the figures, embodiments of the present disclosure are directed to a vehicle information display system and an instrument panel assembly configured to project vehicle information onto a windshield or on a meter panel which can reduce packaging space relative to current systems and instrument panel assemblies having such functions. The information display system and the instrument panel assembly utilize a single electronic display to either display vehicle information on the meter panel or to project vehicle information onto the windshield so as to reduce the number of components needed to perform both functions, and thus reduce packaging space.

In one embodiment, the vehicle information display system is mounted onto an instrument panel assembly. The instrument panel assembly includes a meter panel having a first display opening. The vehicle information display system includes an electronic display configured to visually display vehicle information through the first display opening. The electronic display is rotatably mounted at the first display opening so as to be visible through the first display opening in a first mode of operation and move away from the first display opening in another instance to reduce or obscure its visibility through the first display opening in a second mode of operation. The vehicle information display system further includes a first panel. The first panel is rotatably mounted at the first display opening so as to be visible through the first display opening when the electronic display is moved away from the first display opening in the second mode of operation and move away from the first display opening when the electronic display is visible through the first display opening in the first mode of operation. A first drive system positions the electronic display and the first panel. A heads up display unit projects the vehicle information onto the windshield when the first panel is visible through the opening.

Figure 1:
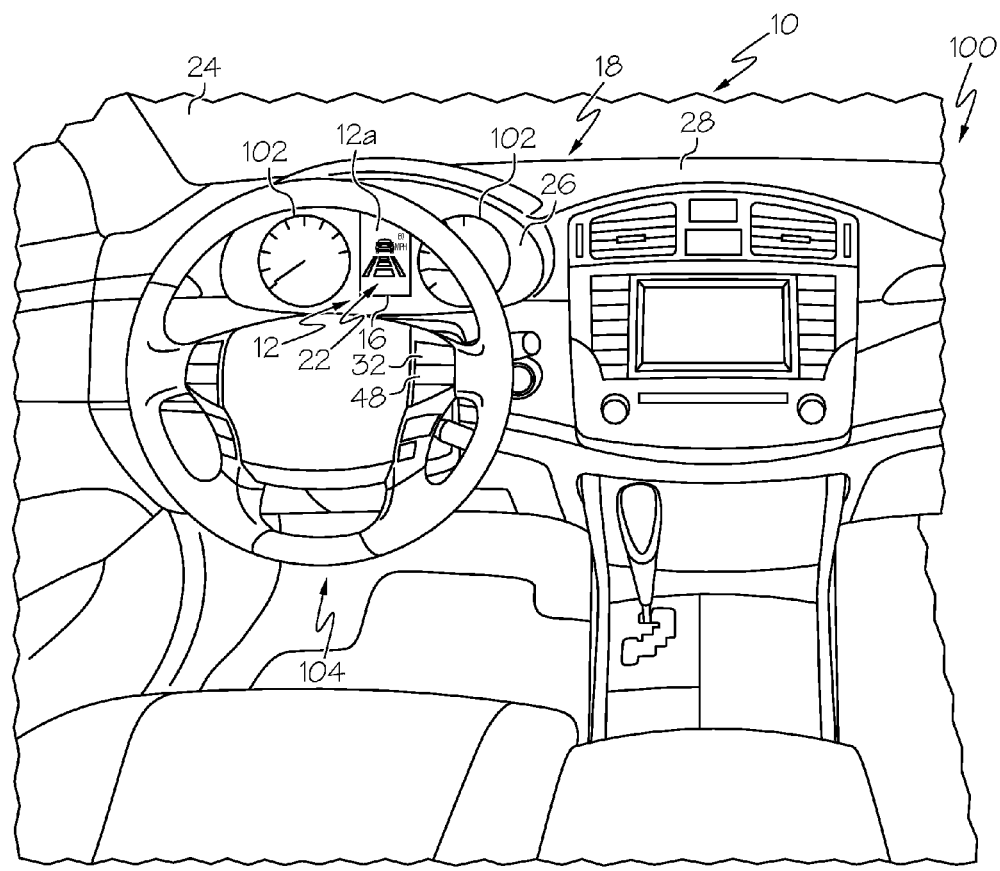
FIG. 1 schematically depicts a frontal view of a vehicle information display system and instrument panel assembly according to one or more embodiments described and illustrated herein showing the electronic display.
Figure 2:
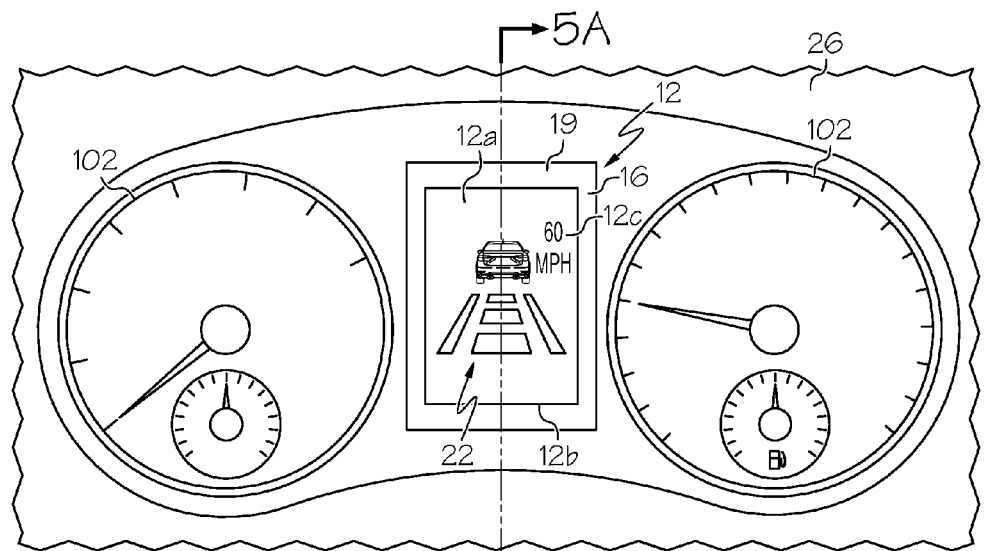
FIG. 2 is an isolated view of a meter panel showing an electronic display in FIG. 1 covering a first display opening.
Figure 3:
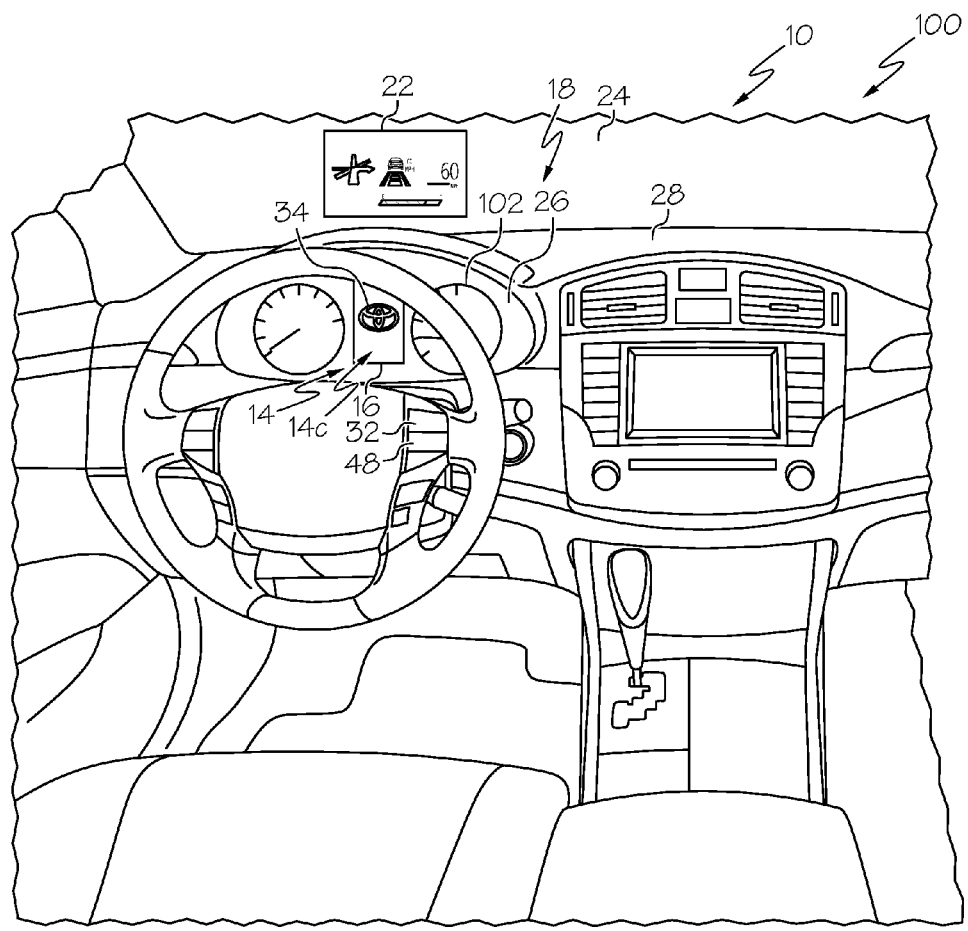
FIG. 3 schematically depicts a frontal view of the vehicle information display system of FIG. 1 showing a first panel.

Referring now to FIGS. 1-4, a vehicle information display system 10 is provided. In one embodiment, the vehicle information display system 10 includes an electronic display 12 and a first panel 14 (FIG. 3). The electronic display 12 and the first panel 14 are rotatably mounted at a first display opening 16 of an instrument panel assembly 18. The electronic display 12 and the first panel 14 alternatively cover the first display opening 16 so as to be visible through the first display opening 16.

The vehicle information display system 10 includes a heads up display unit 20 (FIG. 3). The vehicle information display system 10 is illustratively shown to be adapted for use in instrument panel assembly 18 of an automotive vehicle 100, but it should be appreciated that the vehicle information display system 10 may be used in other vehicles to include boats, motorcycles, planes and the like. The vehicle information display system 10 provides vehicle information 22 on the instrument panel assembly 18 or provides vehicle information 22 on the windshield 24 wherein a fixed indicia 34 (FIG. 4) replaces the vehicle information 22 displayed on the instrument panel assembly 18.

FIG. 1 is an illustrative view of the instrument panel assembly 18 taken from the cabin space of an automotive vehicle 100. FIG. 1 also shows the vehicle information display system 10 operating in the first mode of operation. In the first mode of operation, vehicle information 22 is displayed through the instrument panel assembly 18.

The instrument panel assembly 18 includes a meter panel 26. The meter panel 26 may be formed from an injection molded processes and may include a plurality of windows for displaying instruments 102, and vehicle information 22. The instrument panel assembly 18 further includes a top panel 28. The top panel 28 is generally orthogonal to the meter panel 26 and extends from a top edge of the meter panel 26 to a windshield 24. Behind the meter panel 26 is packaging space 30 (shown in FIG. 5A) for accommodating vehicle components (not shown), to include electric components, ducts, and the like. In some embodiments, the instrument panel assembly 18 may include a protective cover 19 that may be a transparent material, such as plastic that allows viewing of the meter panel 26 therethrough.

Figure 6A:
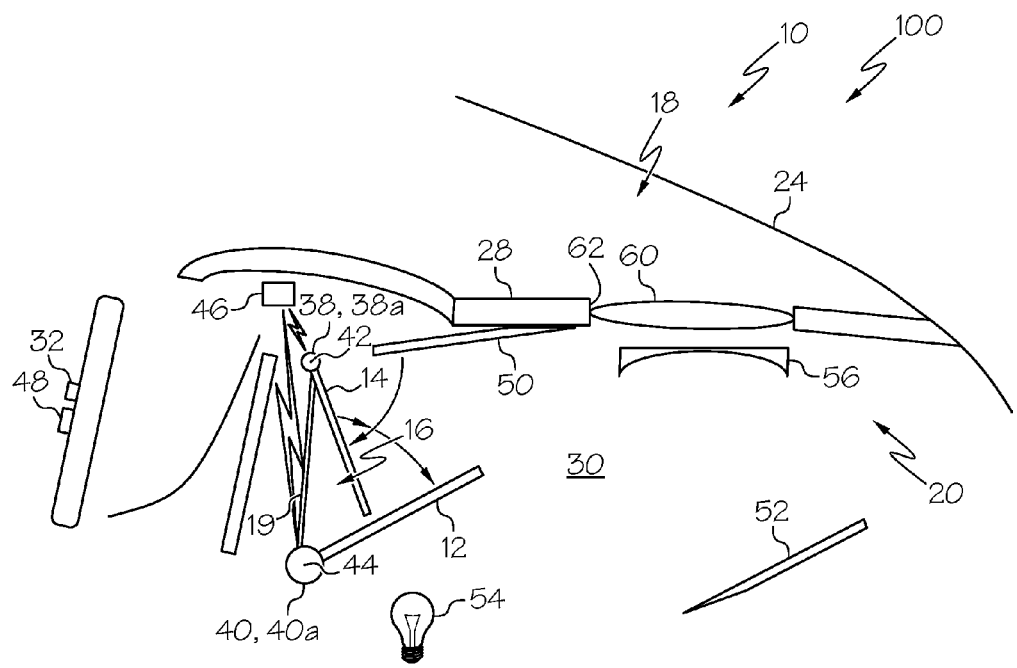
FIG. 6A is cross-sectional view of FIG. 6B showing the transition of the first panel and the electronic display.
Figure 7A:
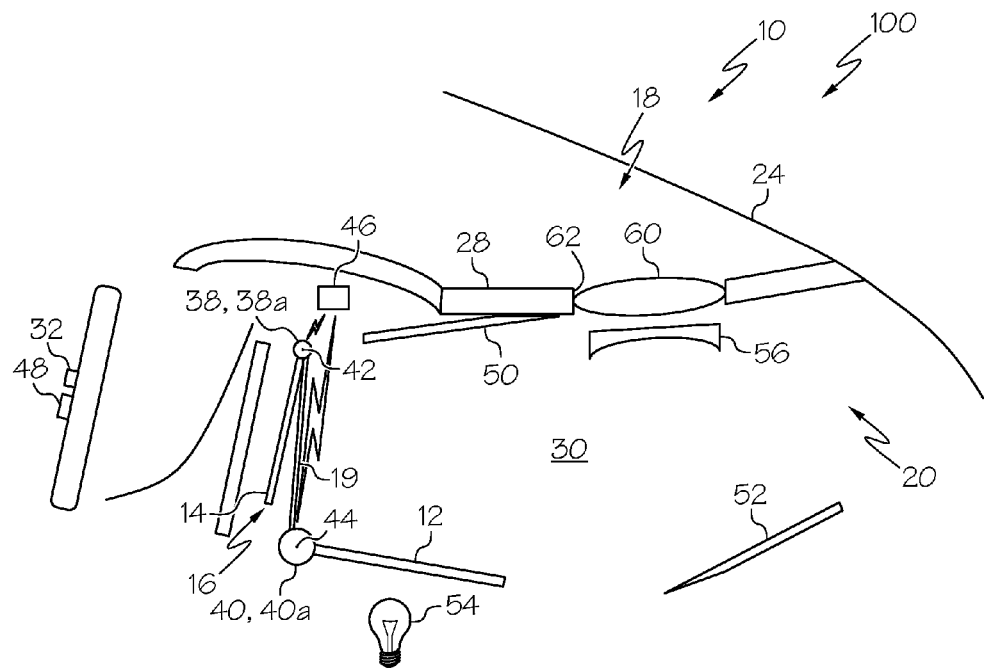
FIG. 7A is cross-sectional view of FIG. 4 taken along lines 7A-7A.

The meter panel 26 is illustratively shown disposed behind a steering wheel 104. The meter panel 26 illustratively includes a pair of instruments 102 disposed behind a corresponding protective cover 19 of the meter panel 26. The meter panel 26 further includes a first display opening 16. An electronic display 12 is illustratively shown disposed between the pair of instruments 102 and visible through the first display opening 16. The electronic display 12 is rotatably mounted at the first display opening 16 so as to be rotated forward into the packaging space 30 (as shown in FIGS. 6A and 7A) in the second mode of operation and rearward in toward the first display opening in the first mode of operation, as shown by FIGS. 1 and 2.

FIG. 2 is an isolated view of the meter panel 26 showing the electronic display 12. The electronic display 12 is illustratively shown depicting the speed of the automotive vehicle 100. However, it should be appreciated that the vehicle information 22 shown is not limiting but provided for illustrative purposes. The electronic display 12 may be configured to provide different types of vehicle information 22, to include fuel information, e.g., distance to empty, fuel economy, and the like. For use herein, the term "vehicle information" may also include information which relates to the operation of the vehicle, to include directions for a predetermined route, environmental temperatures, maintenance notices and system warnings. Vehicle information may also include information external to the automotive vehicle 100, such as provided by a camera or other devices.

The electronic display 12 is configured to visually display vehicle information 22. The electronic display 12 is rotatably mounted at the first display opening 16. For illustrative purposes, the electronic display 12 is shown as a liquid crystal display; however, it should be appreciated that any electronic display 12 configured to display a visual image when electrically powered may be adapted for use herein, illustratively including, and without limitation, a plasma display, organic light emitting diode, etc.

FIG. 1 illustratively shows a first operator input 32 mounted to the steering wheel 104. The first operator input 32 is configured to select from one of a plurality of vehicle information 22 to be displayed by the electronic display 12. Accordingly, the user may actuate the first operator input 32 so as to change the vehicle information 22 being displayed. The first operator input 32 is illustratively shown as a button disposed on the steering wheel 104. However, it should be appreciated that the first operator input 32 may be located elsewhere in the cabin space of the automotive vehicle 100, or may take a form other than a button, to include a microphone and a voice recognition processor configured to select the vehicle information 22 upon a predetermined verbal command.

The electronic display 12 has a display surface 12a seen from the cabin space through the first display opening 16. The electronic display 12 has a first peripheral edge 12b defining a body 12c adapted to fit within the first display opening 16. For illustrative purposes, the first peripheral edge 12b may be spaced apart from a periphery of the first display opening 16 so as to define a gap therebeween and provide tolerance for the electronic display 12 to be viewed through the first display opening 16. However, it should be appreciated that that gap may be made smaller and less visible, or non-existent, based upon customer preference, and that the size of the electronic display 12 in relation to the first display opening 16 is provided herein for illustrative purposes and is not limiting to the scope of the appended claims.

FIG. 3 is an illustrative view of the instrument panel assembly 18 taken from the cabin space of an automotive vehicle 100 showing the vehicle information display system 10 operating in the second mode of operation. In the second mode of operation, the first panel 14 is disposed within the first display opening 16, instead of the electronic display 12. The first panel 14 is rotatably mounted at the first display opening 16. The electronic display 12 can be rotated forward into the packaging space 30 as indicated in FIG. 7A, and the vehicle information 22 can be projected onto the windshield 24, the details of which will be described in greater detail below.

Figure 4:
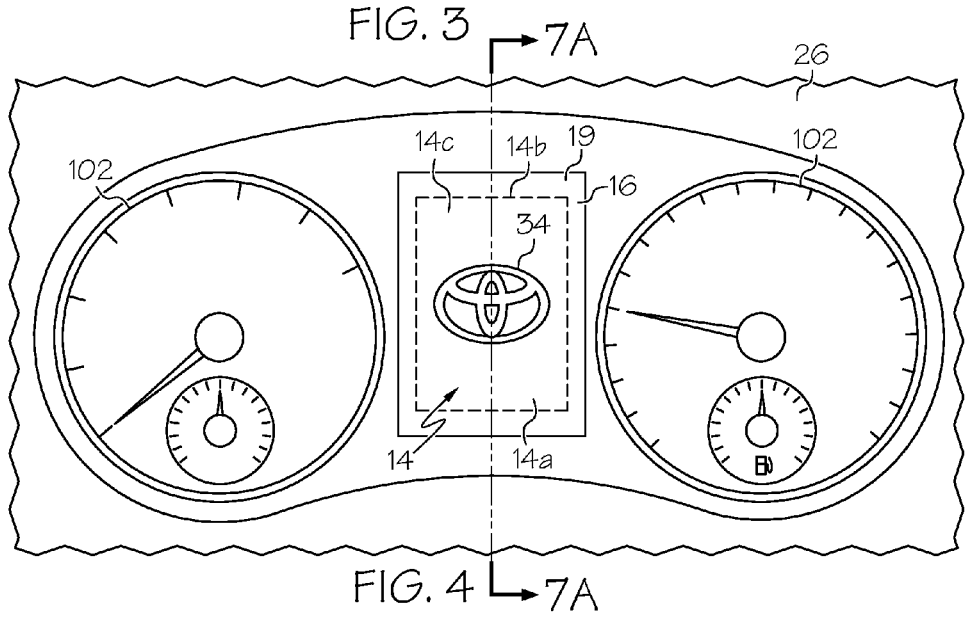
FIG. 4 is an isolated view of a meter panel showing the first panel in FIG. 3 covering the first display opening.

FIG. 4 is an isolated view of an illustrative embodiment of the meter panel 26 shown in FIG. 3. The first panel 14 includes an outer surface 14a which is visible through the first display opening 16 from the cabin space of the automotive vehicle 100. The first panel 14 is shown with a fixed indicia 34 disposed on the outer surface 14a so as to provide an aesthetic appeal to the meter panel 26. It should be appreciated that the fixed indicia 34 shown is provided for illustrative purposes and is not limiting to the scope of the appended claims. The fixed indicia 34 may be customized to a user's preference, such as the user's initials, favorite sports team, or the like. The first panel 14 may be a generally planar member formed from an injection molded process. The outer surface of the first panel 14 may be surfaced with a high gloss finish, or covered with a material such as synthetic leather, or real leather. The fixed indicia 34 may be mounted onto the outer surface 14a of the first panel 14 or etched thereon. This customization may be done by the purchaser and completed during the manufacturing process.

The first panel 14 has a second peripheral edge 14b defining a body 14c adapted to fit within or otherwise be seen through the first display opening 16, for example, in a fashion similar to that described above in regard to the electronic display 12. For illustrative purposes, FIG. 4 shows the second peripheral edge 14b spaced apart from the first display opening 16 so as to define a gap. However, it should be appreciated that that gap may be made smaller and less visible, or non-existent, based upon customer preference, and that the dimensions of the first panel 14 in relation to the first display opening 16 are provided herein for illustrative purposes and is not limiting to the scope of the appended claims. With reference again to FIG. 2, the first peripheral edge 12b is shown having the same dimension as the second peripheral edge 14b.

Figure 5A:
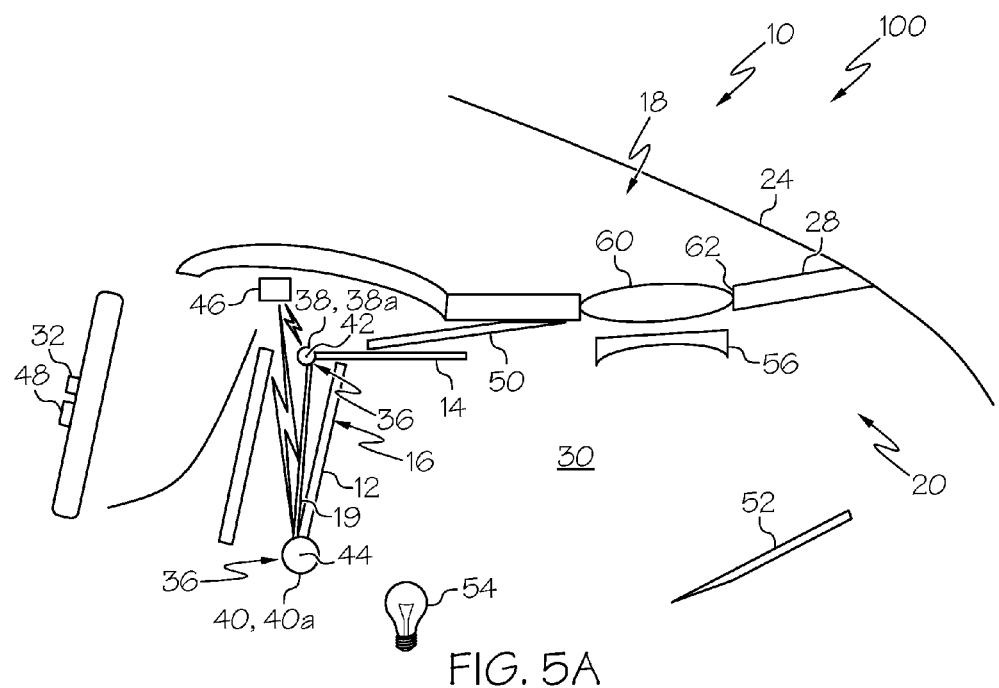
FIG. 5A is cross-sectional view of FIG. 1 taken along lines 5-5 of FIG. 2.
Figure 5B:
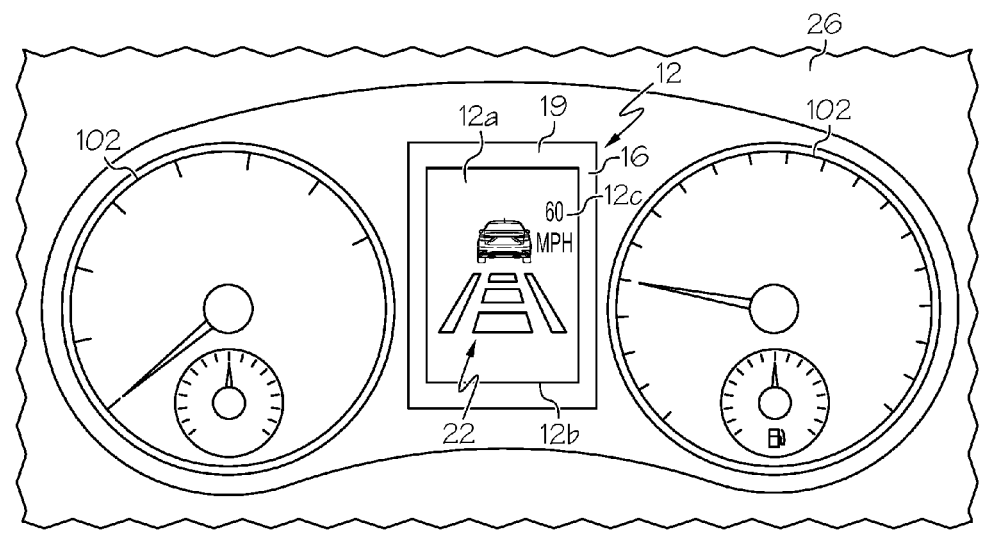
FIG. 5B is frontal view of FIG. 5A showing the meter panel and the electronic display in isolation.

FIGS. 5A, 6A and 7A, are schematic, cross-sectional views of the instrument panel assembly 18. FIG. 5A shows the position of the first panel 14 and the electronic display 12 as the vehicle information display system 10 is in the first mode of operation. FIG. 7A shows the position of the first panel 14 and the electronic display 12 as the vehicle information display system 10 is in the second mode of operation. FIG. 6A shows the first panel 14 and the electronic display 12 in an intermediate state between the first mode of operation and the second mode of operation.

FIGS. 5A, 6A and 7A also provide an illustrative view of the components of the vehicle information display system 10, to include a first drive system 36 (e.g., including one or more motors or other suitable actuators). The first drive system 36 is mechanically coupled to the electronic display 12 and the first panel 14. The first drive system 36 positions the electronic display 12 and the first panel 14 so as to alternatively cover the first display opening 16.

In one embodiment, the first drive system 36 includes a first panel drive 38 and an electronic display drive 40. The first panel drive 38 is mechanically coupled to the first panel 14 so as to rotate the first panel 14 about a first pivot point 42 forward and rearward. The electronic display drive 40 is mechanically coupled to the electronic display 12 so as to rotate the electronic display 12 about a second pivot point 44 forward and rearward. A controller 46 is configured to receive a command for positioning the vehicle information display system 10 in either the first mode of operation or the second mode of operation. The command may be issued by the actuation of a second user input 48. The second user input 48 is illustratively shown as a button disposed on the steering wheel 104. However, it should be appreciated that the second user input 48 may be located elsewhere in the vehicle cabin, or may take a form other than a button, to include a microphone and a voice recognition processor configured to actuate the first drive system 36 upon a predetermined verbal command.

In one embodiment, the first panel drive 38 is a first servo motor 38a configured to rotate the first panel 14 between a first position and a second position, and the electronic display drive 40 is a second servo motor 40a configured to rotate the electronic display 12 between a third position and a fourth position. The first and second servo motors 38a, 40a may include a position sensor so to determine when the first panel 14 and second panel has reached a respective first position, second position, third position and fourth position. Any servo motor currently known and used, or later developed may be adapted for use herein, illustratively including a direct current servo motor.

FIG. 5A shows the first panel 14 in the second position wherein the first panel 14 is clear of the first display opening 16, and the electronic display 12 in the third position wherein the electronic display 12 is visible through the first display opening 16. In the first position, the first panel 14 may be rotated so as to be disposed generally above the first display opening 16 and disposed within the packaging space 30. The electronic display 12 can be rotated so as to be generally flush with the outer surface of the meter panel 26 or otherwise visible through the first display opening 16.

FIG. 7A shows the first panel 14 in the first position wherein the first panel 14 is visible through the first display opening 16 and the electronic display 12 in the fourth position wherein the electronic display 12 is clear of the first display opening 16. In the fourth position, the electronic display 12 is disposed generally beneath the first display opening 16. The electronic display 12 can be positioned so as to be placed in communication with a heads up display unit 20, wherein vehicle information 22 displayed on the display is projected onto the windshield 24.

FIG. 6A shows an intermediate state wherein the movement of the first panel 14 and the electronic display 12 are synchronized so as to not physically interfere with each other. The arrows show the movement of the electronic display 12 from the third position to the fourth position and the first panel 14 from the second position to the first position. It should be appreciated that the movement of the first panel 14 should be coordinated with the movement of the electronic display 12 so as to prevent the first panel 14 from colliding with the electronic display 12. For instance, the controller 46 may be configured to first actuate the electronic display drive 40 so as to move the electronic display 12 to the fourth position, wherein the controller 46 actuates the first panel drive 38 so as to move the first panel 14 into the first position when the electronic display 12 has cleared the path of the moving first panel 14.

With reference again to FIGS. 5A, 6A and 7A, the vehicle information display system 10 further includes a heads up display unit 20. The heads up display unit 20 is configured to project the vehicle information 22 shown by the electronic display 12 onto the windshield 24. FIG. 5A shows the shows the first mode of operation wherein the first drive system 36 positions the electronic display 12 so as to be visible through the first display opening 16 and positions the first panel 14 so as to be behind the electronic display 12. In the first mode of operation, the vehicle information 22 is displayed at the meter panel 26. FIG. 7A shows the second mode of operation wherein the first drive system 36 positions the first panel 14 so as to be visible through the first display opening and the electronic display 12 is positioned in communication with the heads up display unit 20 so as to display the vehicle information 22 onto the windshield 24.

Figure 9A:
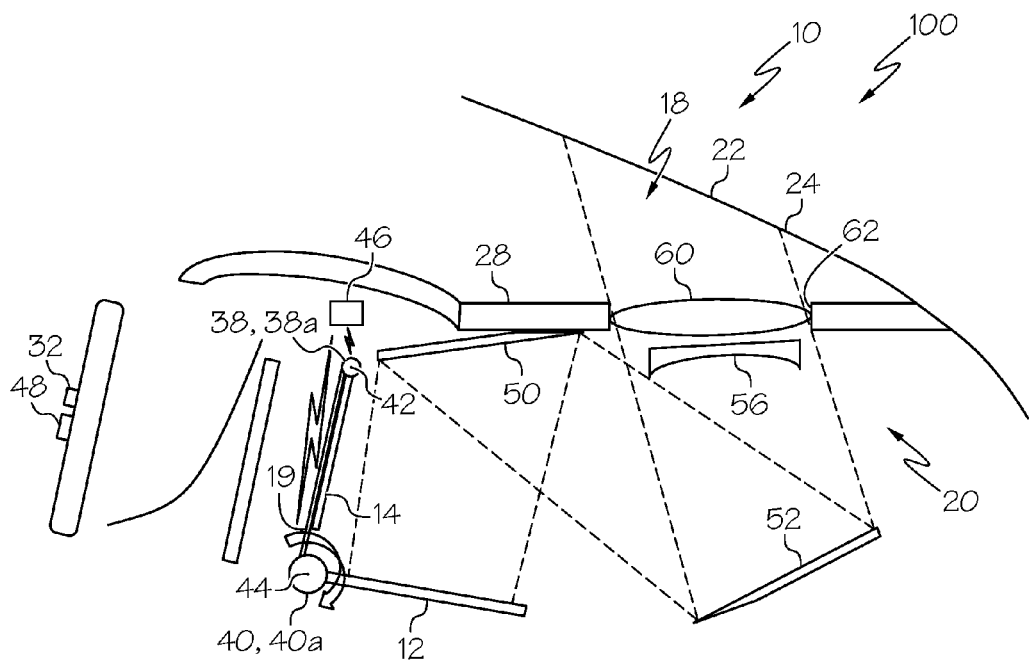
FIG. 9A is a view of FIG. 7A showing the operation of the heads up display unit.

With reference again to FIGS. 5A, 6A and 7A and also to FIG. 9A, in one embodiment, the heads up display unit 20 includes a first mirror 50 and a second mirror 52. The first and second mirrors 50, 52 are disposed within the packaging space 30. The first mirror 50 and the second mirror 52 may be fixedly mounted within the packaging space 30. The first mirror 50 is positioned behind the meter panel 26 and is elevated relative to the electronic display 12. The second mirror 52 is disposed beneath the first mirror 50 and further forward from the first panel 14 relative to the first mirror 50. The first mirror 50 is angled so as to receive an image from the electronic display 12 and reflect the image onto the second mirror 52. The second mirror 52 is angled so as to receive an image from the first mirror 50 and reflect the reflection of the first mirror 50 onto the windshield 24.

The vehicle information display system 10 may further include a light source 54. The light source 54 is disposed within the packaging space 30 and positioned behind the electronic display 12 so as to project the vehicle information onto the first mirror 50. The light source 54 may be desirable to help provide a brighter image on the windshield 24. Further, the light source 54 may be configured to be adjusted in terms of the light intensity so as to adjust the display on the windshield to accommodate various environmental conditions. For instance, the light source 54 may be dimmed during night time driving conditions or the intensity increased during day time driving conditions. The first mirror 50 is above the electronic display 12 and tilted so as to reflect the vehicle information 22 onto the second mirror 52. The second mirror 52 receives the reflection from the first mirror 50 and projects the reflection onto the windshield 24 where the reflection passes through the first and second lenses 56, 60 wherein the vehicle information 22 is enlarged and displayed in its intended orientation, as shown in FIG. 3.

In one embodiment, the heads up display unit 20 is configured to enlarge the vehicle information 22 displayed on the electronic display 12. The heads up display unit 20 may further include a first lens 56. The first lens 56 may be configured to enlarge the reflection from the second mirror 52 so as to generate a projection of the vehicle information 22 onto the windshield 24. Lenses configured to enlarge images are currently known and used and later developed may be adapted for use herein, illustratively including a concave lens.

For illustrative purposes, the first lens 56 is shown disposed between the second mirror 52 and the windshield 24. The first lens 56 is shown illustratively disposed between the second mirror 52 and the windshield 24. However, it should be appreciated that the first lens 56 may be positioned elsewhere, such as between the electronic display 12 and the first mirror 50, or between the first mirror 50 and the second mirror 52. It should be appreciated that the clarity and enlargement of the image is based upon physical characteristics of the first lens 56, to include the focal point of the first lens 56, the distance between the first lens 56 and the second mirror 52, and the distance between the first lens 56 and the windshield 24.

Figure 9B:
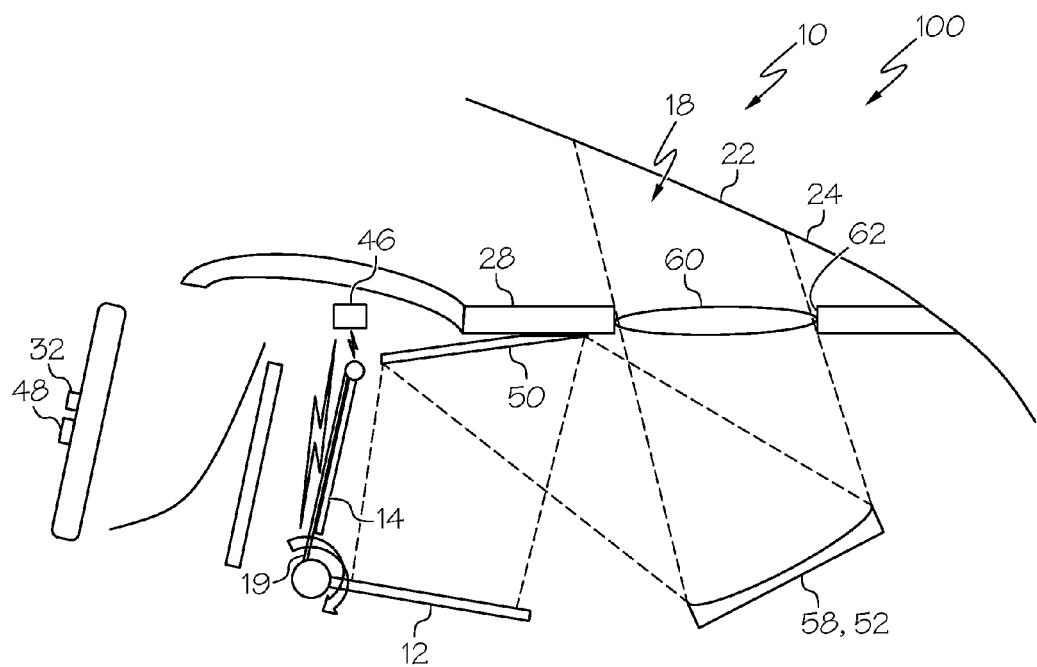
FIG. 9B is a cross-sectional view of a vehicle information display system according to one or more embodiments described and illustrated herein having a magnifying mirror.

FIG. 9B is an illustrative cross-sectional view of another embodiment of the vehicle information display system 10 wherein image of the vehicle information 22 is enlarged using a magnifying mirror 58. The magnifying mirror 58 may be a mirror having a concave surface so as to enlarge the image of the vehicle information 22. For illustrative purposes the magnifying mirror 58 is shown as being the second mirror 52. However, it should be appreciated that the magnifying mirror 58 may be the first mirror 50. The rays reflected from the magnifying mirror 58 are passed through second lens 60 so as to invert the magnified image.

Figure 9C:
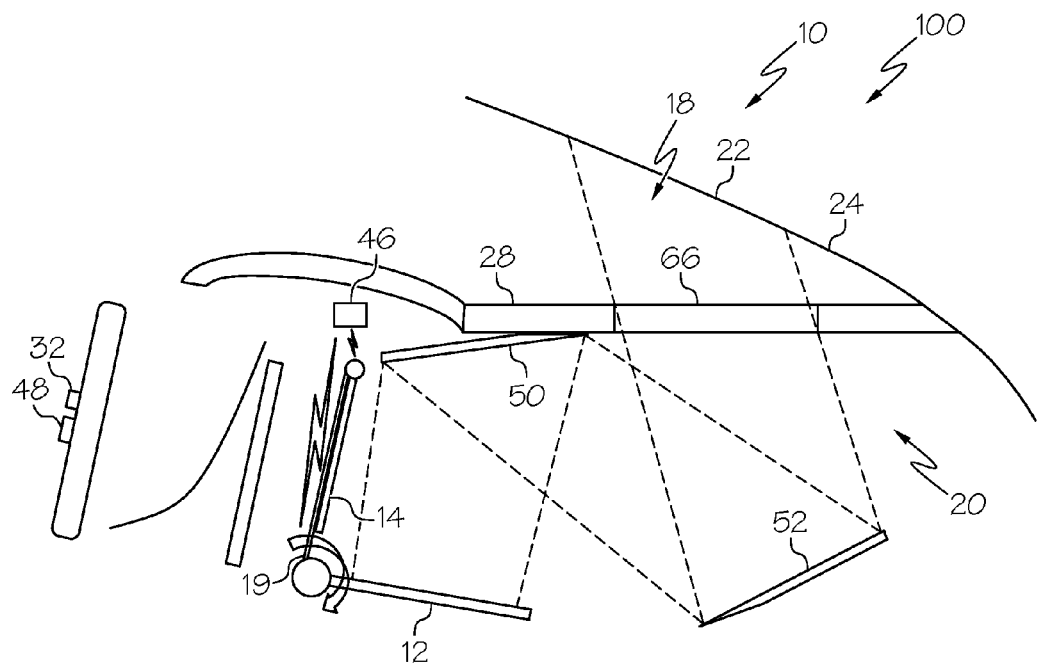
FIG. 9C is a cross-sectional view of a vehicle information display system according to one or more embodiments described and illustrated herein wherein the electronic display is configured to invert and enlarge the vehicle information.

FIGS. 5A, 6A and 7A and also to FIG. 9A show one embodiment of the vehicle information display system 10 configured to invert an image from the electronic display 12 device so as to provide a corrected orientation of the vehicle information 22 on the windshield 24. The vehicle information display system 10 includes a second lens 60. The second lens 60 is configured to invert the image of the vehicle information 22. The second lens 60 is illustratively shown disposed between the second mirror 52 and the windshield 24. In particular, the second lens 60 is mounted to a second opening 62 of the top panel 28 of the instrument panel assembly 18; however the second lens 60 may be disposed in other places, to include between the electronic display 12 and the first mirror 50, or between the first mirror 50 and the second mirror 52. It should also be appreciated that the second lens 60 may also function to enlarge the image. FIG. 9A shows an embodiment of the vehicle information display system 10 wherein the second lens 60 both inverts and enlarges the image of the vehicle information 22. Any such lens currently known or later developed may be adapted for use herein, illustrative FIG. 9C shows another embodiment of a vehicle information display system 10 wherein the heads up display is configured to both invert and enlarge the image of the vehicle information 22. The vehicle information display system 10 includes a including an image processor 64 and a controller 46. The image processor 64 is configured to invert the vehicle information 22 displayed on the electronic display 12 unit. The controller 46 actuates the first drive system 36 so as to move the first panel 14 and the electronic display 12 between the first mode of operation and the second mode of operation. In the second mode of operation, the controller 46 is further configured to actuate the image processor 64 wherein the vehicle information 22 displayed on the electronic display 12 is inverted.

With reference again to FIGS. 1-9A, a description of the operation of the vehicle information display system 10 is provided. FIGS. 1 and 2 show the vehicle information display system 10 in the first mode of operation. The electronic display 12 is actuated so as to show vehicle information 22. The electronic display 12 may be automatically actuated in response to the vehicle being actuated. The vehicle information 22 is shown displayed on the meter panel 26. FIG. 5A shows the position of the first panel 14 relative to the electronic display 12. The first panel 14 is behind the meter panel 26 and above a path of rotation of the electronic display 12.

Figure 6B:
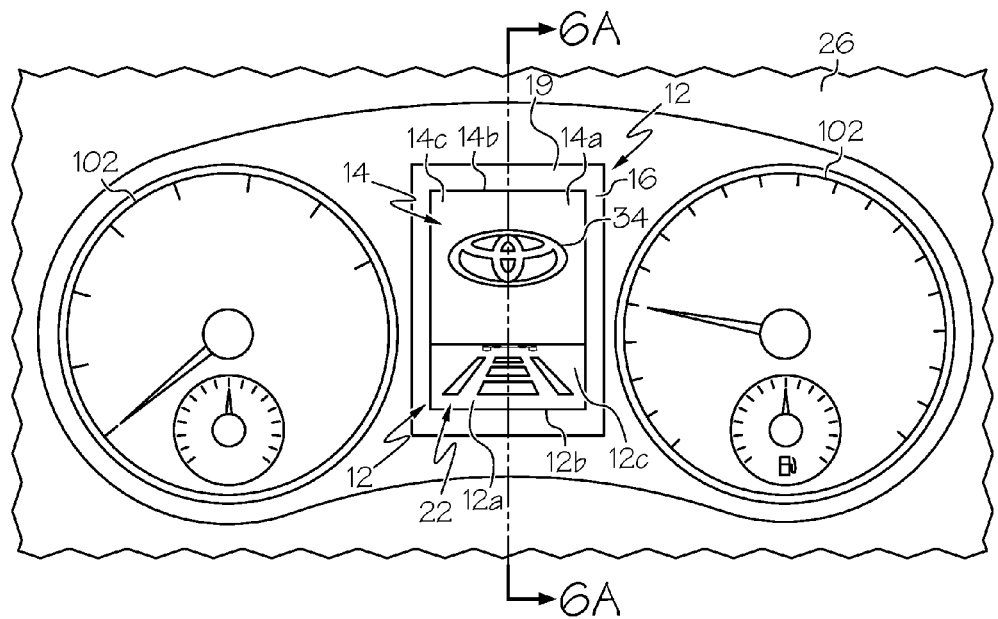
FIG. 6B is a frontal view of FIG. 6A showing the transition of the first panel and the electronic display.

FIGS. 6A and 6B show the vehicle display in an intermediate position, moving from the first mode of operation to the second mode of operation. The user has actuated the second input 48 so as to project the vehicle information 22 onto the windshield 24. FIG. 6A shows the first drive system 36 rotating the electronic display 12 out of the first display opening 16, and the first panel 14 rotating towards the first display opening 16. The controller 46 coordinates the rotation of the electronic display 12 with the rotation of the first panel 14 so as to prevent the two from colliding. The first mirror 50 and second mirror 52 remain in place.

Figure 7B:
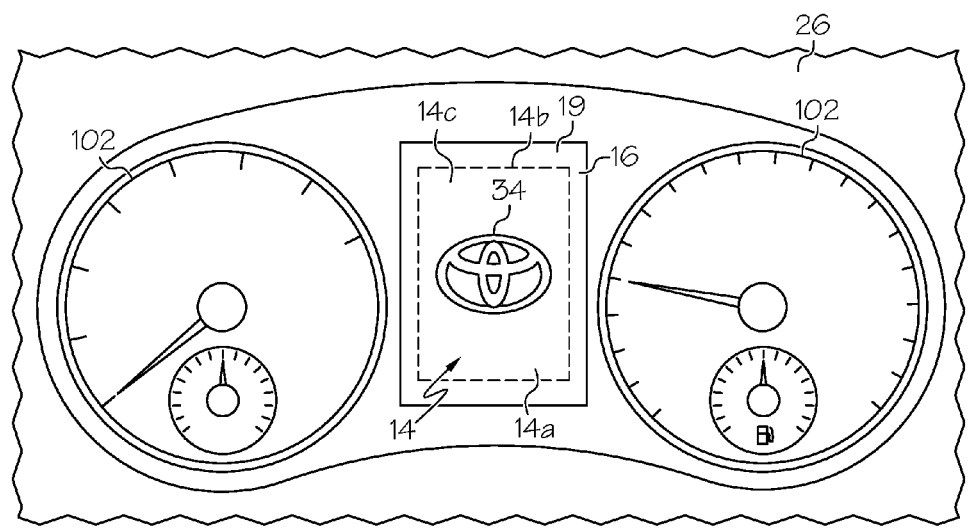
FIG. 7B is frontal view of FIG. 7A showing the meter panel and first panel in isolation.
Figure 8:
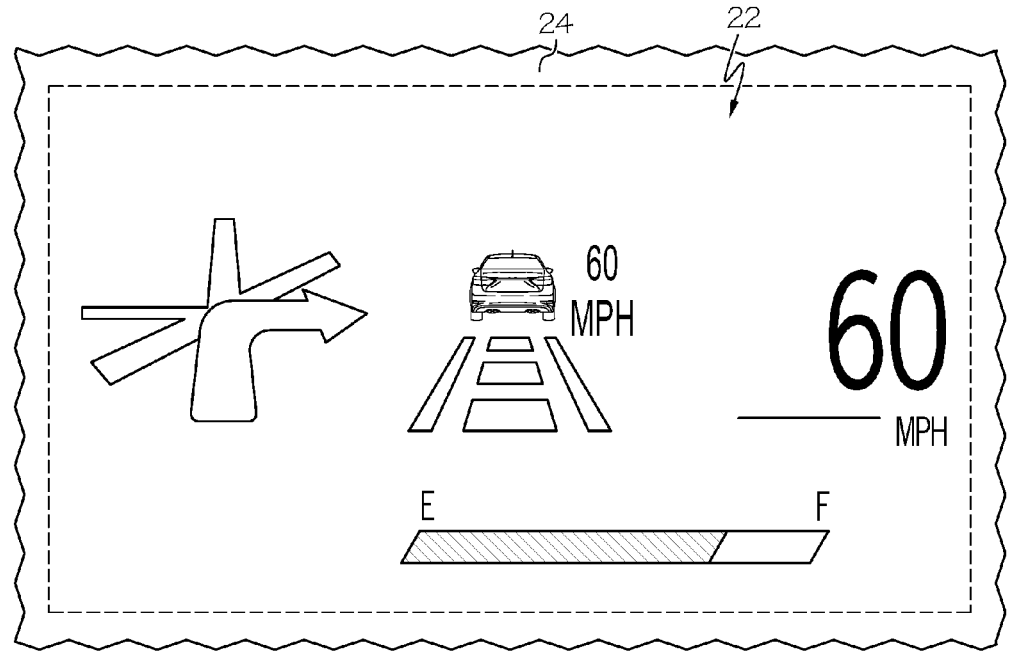
FIG. 8 is a frontal view showing the vehicle information displayed on the windshield.

FIGS. 7A, 7B and 9A show the vehicle display in the second mode of operation. The first panel 14 is disposed within the first display opening 16. The fixed indicia 34 is thus displayed on the meter panel 26. The electronic display 12 is rotated back into the packaging space 30. FIG. 9A shows the first mirror 50 reflecting the image of the vehicle information 22 from the electronic display 12 onto the second mirror 52. The second mirror 52 projects the vehicle information 22 onto the windshield 24.

FIG. 9B shows another embodiment of the vehicle information display system 10 wherein the vehicle information 22 image is enlarged using a magnifying mirror 58. The magnifying mirror 58 may be a mirror having a concave surface so as to enlarge the image of the vehicle information 22. For illustrative purposes the magnifying mirror 58 is shown as being the second mirror 52. However, it should be appreciated that the magnifying mirror 58 may be the first mirror 50. The heads up display unit 20 includes an image processor 64 configured to invert the image. The controller 46 actuates the image processor 64 so as to convert the image when the electronic display 12 is rotated back into the packaging space 30.

FIG. 9C shows another embodiment shows another embodiment of a vehicle information display system 10 wherein the electronic display 12 is configured to both invert and enlarge the image of the vehicle information 22. The vehicle information display system 10 includes a including an image processor 64 and a controller 46. The image processor 64 is in communication with the electronic display 12 and inverts and enlarges the vehicle information 22 displayed on the electronic display 12 unit when the vehicle information display system 10 is in the second mode of operation. Accordingly, the vehicle information display system 10 does not require additional lenses for changing the optical output displayed on the windshield 24. FIG. 9A shows a transparent window 66 mounted to the second opening 62 of the top panel 28. The transparent window does not change the angle of light waves.

With reference again to FIGS. 1-9A, an embodiment of instrument panel assembly 18 is configured to generate a heads up display on a windshield 24 of vehicle information 22 or provide vehicle information 22 on a meter panel 26 of the instrument panel assembly 18. The instrument panel assembly 18 is illustratively shown to be adapted for use in an automotive vehicle 100, but it should be appreciated that the instrument panel assembly 18 may be used in other vehicles to include boats, motorcycles, planes and the like. The instrument panel assembly 18 includes a meter panel 26 having a first display opening 16. An electronic display 12 and a first panel 14 are both mounted to the first display opening 16. The electronic display 12 is configured to visually display vehicle information 22. The first panel 14 includes an outer surface having a fixed indicia 34.

The instrument panel assembly 18 includes a meter panel 26 and a top panel 28. The meter panel 26 may be formed from an injection molded processes and may include a plurality of windows for displaying instruments, and vehicle information 22. The top panel 28 is generally orthogonal to the meter panel 26 and extends from a top edge of the meter panel 26 to a windshield 24. Behind the meter panel 26 is packaging space 30 (shown in FIG. 5A) for accommodating vehicle components, to include electric components, ducts, and the like. The meter panel 26 is illustratively shown disposed behind a steering wheel 104. The meter panel 26 illustratively includes a pair of instrument displays disposed behind a corresponding window of the meter panel 26. The meter panel 26 further includes a first display opening 16.

The electronic display 12 is configured to visually display vehicle information 22. The electronic display 12 is rotatably mounted to the first display opening 16. For illustrative purposes, the electronic display 12 is shown as a liquid crystal display, however, it should be appreciated that any electronic display 12 configured to display a visual image when electrically powered may be adapted for use herein, illustratively including, and without limitation, a plasma display.

The electronic display 12 has a display surface 12a seen from the cabin space. The electronic display 12 has a first peripheral edge 12b defining a body adapted to fit within the first display opening 16. For illustrative purposes, FIG. 2 shows the first peripheral edge 12b spaced apart from the opening so as to define a gap. However, it should be appreciated that that gap may be made smaller and less visible, or non-existent, based upon customer preference, and that the dimensions of the electronic display 12 in relation to the first display opening 16 are provided herein for illustrative purposes and is not limiting to the scope of the appended claims.

The instrument panel assembly 18 further includes a first panel 14. FIGS. 3 and 4 provide an illustrative view of the first panel 14. The first panel 14 includes an outer surface which is visible from the cabin space of the vehicle. The first panel 14 is shown with a fixed indicia 34 disposed on the outer surface so as to provide an aesthetic appeal to the meter panel 26. It should be appreciated that the fixed indicia 34 shown is provided for illustrative purposes and is not limiting to the scope of the appended claims. The fixed indicia 34 may be customized to a user's preference, such as the user's initials, favorite sports team, or the like.

The first panel 14 has a second peripheral edge 14b defining a body adapted to fit within the first display opening 16. For illustrative purposes, FIG. 4 shows the second peripheral edge 14b spaced apart from the opening so as to define a gap. However, it should be appreciated that that gap may be made smaller and less visible, or non-existent, based upon customer preference, and that the dimensions of the first panel 14 in relation to the first display opening 16 are provided herein for illustrative purposes and is not limiting to the scope of the appended claims. With reference again to FIG. 2, the first peripheral edge 12b is shown having the same dimension as the second peripheral edge 14b.

FIGS. 5A, 6A and 7A, are cross-sectional views of the instrument panel assembly 18 showing the position of the first panel 14 and the electronic display 12 as the vehicle instrument panel assembly 18 moves from a first mode of operation to a second mode of operation, wherein FIG. 6A shows the first panel 14 and the electronic display 12 in an intermediate state between the first mode of operation and the second mode of operation.

FIGS. 5A, 6A and 7A also provide an illustrative view of the components of the instrument panel assembly 18, to include a first drive system 36. The first drive system 36 is mechanically coupled to the electronic display 12 and the first panel 14. The first drive system 36 positions the electronic display 12 and the first panel 14 so as to alternatively cover the first display opening 16.

In one embodiment, the first drive system 36 includes a first panel drive 38 and an electronic display drive 40. The first panel drive 38 is mechanically coupled to the first panel 14 so as to rotate the first panel 14 about a first pivot point 42. The electronic display drive 40 is mechanically coupled to the electronic display 12 so as to rotate the electronic display 12 about a second pivot point 44. A controller 46 is configured to receive a command for positioning the instrument panel assembly 18 in either the first mode of operation or the second mode of operation.

In one embodiment, the first panel drive 38 is a first servo motor 38a configured to rotate the first panel 14 between a first position and a second position, and the electronic display drive 40 is a second servo motor 40a configured to rotate the electronic display 12 between a third position and a fourth position. The servo motor may include a position sensor so to determine when the first panel 14 and second panel has reached a respective first position, second position, third position and fourth position. Any servo motor currently known and used, or later developed may be adapted for use herein, illustratively including a direct current servo motor.

FIG. 5A shows the first panel 14 in the second position wherein the first panel 14 is clear of the first display opening 16, and the electronic display 12 in the third position wherein the electronic display 12 covers the first display opening 16. In the first position, the first panel 14 may be rotated so as to be disposed generally above the first display opening 16.

FIG. 7A shows the first panel 14 in the first position wherein the first panel 14 covers the first display opening 16 and the electronic display 12 in the fourth position wherein the electronic display 12 is clear of the opening. In the fourth position, the electronic display 12 is disposed generally beneath the opening. The electronic display 12 is positioned so as to be placed in communication with a heads up display unit 20, wherein vehicle information 22 displayed on the display is projected onto the windshield 24.

FIG. 6A shows an intermediate state wherein the movement of the first panel 14 and the electronic display 12 are synchronized so as to not physically interfere with each other. The arrows show the movement of the electronic display 12 from the third position to the fourth position and the first panel 14 from the second position to the first position. It should be appreciated that the movement of the first panel 14 should be coordinated with the movement of the electronic display 12 so as to prevent the first panel 14 from colliding with the electronic display 12. For instance, the controller 46 may be configured to first actuate the electronic display drive 40 so as to move the electronic display 12 to the fourth position, wherein the controller 46 actuates the first panel drive 38 so as to move the first panel 14 into the first position when the electronic display 12 has cleared the path of the moving first panel 14.

With reference again to FIGS. 5A, 6A and 7A, the instrument panel assembly 18 further includes a heads up display unit 20. The heads up display unit 20 is configured to project the vehicle information 22 shown by the electronic display 12 onto the windshield 24. FIG. 5A shows the shows the first mode of operation wherein the first drive system 36 positions the electronic display 12 so as to cover the opening and positions the first panel 14 so as to be behind the electronic display 12. In the first mode of operation the vehicle information 22 is displayed on the meter panel 26. FIG. 7A shows the second mode of operation wherein the first drive system 36 positions the first panel 14 so as to cover the display and the electronic display 12 is positioned in communication with the heads up display unit 20 so as to display the vehicle information 22 onto the windshield 24.

With reference again to FIGS. 5A, 6A and 7A and also to FIG. 9A, in one embodiment, the heads up display unit 20 includes a first mirror 50 and a second mirror 52. The first mirror 50 and the second mirror 52 are fixedly mounted within the packaging space 30. The first mirror 50 is positioned behind the meter panel 26 and is elevated relative to the electronic display 12. The second mirror 52 is disposed beneath the first mirror 50 and further back from the first panel 14 relative to the first mirror 50. The first mirror 50 is angled so as to receive an image from the electronic display 12 and reflect the image onto the second mirror 52. The second mirror 52 is angled so as to receive an image from the first mirror 50 and reflect the reflection of the first mirror 50 onto the windshield 24.

The instrument panel assembly 18 may further include a light source 54. The light source 54 is disposed within the packaging space 30 and positioned behind the electronic display 12 so as to project the vehicle information onto the first mirror 50. The first mirror 50 is above the electronic display 12 and tilted so as to reflect the vehicle information 22 onto the second mirror 52. The second mirror 52 receives the reflection from the first mirror 50 and projects the reflection onto the windshield 24 where the reflection passes through the first and second lenses 56, 60 wherein the vehicle information 22 is enlarged and displayed in its intended orientation, as shown in FIG. 3.

In one embodiment, the heads up display unit 20 is configured to enlarge the vehicle information 22 displayed on the electronic display 12. The heads up display unit 20 may further include a first lens 56. The first lens 56 may be configured to enlarge the reflection from the second mirror 52 so as to generate a projection of the vehicle information 22 onto the windshield 24. Lenses configured to enlarge images are currently known and used and later developed may be adapted for use herein, illustratively including a concave lens.

For illustrative purposes, the first lens 56 is shown disposed between the second mirror 52 and the windshield 24. The first lens 56 is shown illustratively mounted to a second opening 62 of the top panel 28. However, it should be appreciated that the first lens 56 may be positioned elsewhere, such as between the electronic display 12 and the first mirror 50, or between the first mirror 50 and the second mirror 52. It should be appreciated that the clarity and enlargement of the image is based upon physical characteristics of the lens, to include the focal point of the first lens 56, the distance between the first lens 56 and the second mirror 52, and the distance between the first lens 56 and the windshield 24.

As illustrated above, various embodiments of the vehicle information display system 10 and instrument panel assembly 18 configured to provide a heads up display of vehicle information 22 on the windshield 24 and display vehicle information 22 on the instrument panel assembly 18 using only one electronic display 12 is provided. The vehicle information display system 10 and instrument panel assembly 18 is able to provide both functions while reducing packaging space 30 relative to current systems having both functions by utilizing a single electronic display 12. Further, the electronic display 12 is replaced with a first panel 14 so as to provide aesthetic appeal to the user when the system is projecting vehicle information 22 on the windshield 24.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle information display system configured to generate a heads up display on a windshield and provide a vehicle information on a meter panel of an instrument panel assembly, the meter panel having a first opening, the vehicle information display system comprising:
    a single electronic display having a display surface opposite a non-display surface, the single electronic display configured to visually display the vehicle information, the single electronic display rotatably mounted to the first opening;
    a first panel, the first panel mounted to the first opening;
    a first drive, the first drive configured to position the single electronic display and the first panel; and
    a heads up display unit, the heads up display unit configured to project a visual display of the vehicle information displayed on the display surface of the single electronic display onto the windshield, wherein in a first mode of operation, the first drive positions the single electronic display so as to cover the first opening wherein the display surface displays vehicle information on the meter panel and positions the first panel so as to be behind the single electronic display, and in a second mode of operation, the first drive positions the first panel so as to cover the first opening and the single electronic display is removed from the first opening and positioned in communication with the heads up display unit so as to display on the display surface the vehicle information onto the windshield.

2. The vehicle information display system of claim 1, wherein the first panel includes an outer surface, and a fixed indicia is disposed on the outer surface.

3. The vehicle information display system of claim 1, wherein the first drive includes a first panel drive and an electronic display drive.

4. The vehicle information display system of claim 3, wherein the first panel drive is a servo motor configured to rotate the first panel between a first position and a second position, wherein in the first position the first panel covers the first opening and in the second position the first panel is clear of the first opening.

5. The vehicle information display system of claim 4, wherein the electronic display drive is a servo motor configured to rotate the single electronic display between a third position and a fourth position, wherein in the third position the single electronic display covers the first opening and in the fourth position the single electronic display is clear of the first opening.

6. The vehicle information display system of claim 1, wherein the heads up display unit includes a first mirror and a second mirror.

7. The vehicle information display system of claim 6, wherein the single electronic display is positioned beneath the first mirror, the first mirror is positioned so as to reflect an image from the single electronic display onto the second mirror, and the second mirror is configured to project the image from the first mirror onto the windshield.

8. The vehicle information display system of claim 1, wherein the heads up display unit is configured to enlarge the vehicle information.

9. The vehicle information display system of claim 1, wherein the single electronic display has a first peripheral edge and the first panel has a second peripheral edge, the first peripheral edge has the same dimension as the second peripheral edge.

10. The vehicle information display system of claim 6, wherein the second mirror is a magnifying mirror, the magnifying mirror enlarging the vehicle information displayed on the windshield, relative to the vehicle information displayed on the single electronic display.

11. The vehicle information display system of claim 1, wherein the single electronic display is a liquid crystal display.

12. The vehicle information display system of claim 6, wherein the heads up display unit further includes a light source, the light source configured to project the vehicle information displayed on the single electronic display onto the first mirror, the first mirror reflecting the vehicle information onto the second mirror and the second mirror reflecting the vehicle information onto the windshield.

13. The vehicle information display system of claim 6, wherein the first mirror and the second mirror are configured to reflect light having a wavelength between 400-700 nanometers.

14. The vehicle information display system as set forth in claim 6, wherein the heads up display unit further includes a lens configured to receive a reflection from the second mirror and project the reflection on to the windshield.

15. The vehicle information display system of claim 14, wherein the lens is configured to invert the reflection from the second mirror.

16. The vehicle information display system of claim 1, further including an image processor, the image processor configured to invert the vehicle information displayed on the single electronic display unit.

17. The vehicle information display system of claim 16, further including a controller, the controller actuating the first drive so as to move the first panel and the single electronic display between the first mode of operation and the second mode of operation, wherein in the second mode of operation the vehicle information displayed on the single electronic display is inverted.

18. An instrument panel assembly configured to generate a heads up display on a windshield, the instrument panel assembly comprising:

a panel housing having an first opening;

a single electronic display having a display surface opposite a non-display surface, the single electronic display configured to visually display vehicle information, the display rotatably mounted to the first opening;

a first panel, the first panel mounted to the first opening;

a first drive, the first drive configured to position the single electronic display and the first panel; and a heads up display unit, the heads up display unit configured to project a visual display of the vehicle information displayed by the single electronic display onto the windshield, the heads up display unit includes a first mirror, a second mirror, a lens and a light source, wherein the light source is configured to project the vehicle information onto the first mirror, and the second mirror is configured to receive a reflection form the first mirror and project the reflection on to the lens, the lens projecting and enlarging the vehicle information onto the windshield, wherein in a first mode of operation, the first drive positions the single electronic display so as to cover the first opening, wherein the display surface displays vehicle information on the meter panel and positions the first panel so as to be behind the single electronic display, and in a second mode of operation, the first drive positions the first panel so as to cover the first opening and the single electronic display is removed from the first opening and positioned in communication with the heads up display unit so as to display the vehicle information onto the windshield.

19. The instrument panel assembly of claim 18, wherein the instrument panel assembly further includes a second opening, the lens mounted to the second opening.

20. The instrument panel assembly of claim 18, further including an image processor, and a controller, the image processor configured to invert the vehicle information displayed on the electronic display unit, the controller actuating the first drive so as to move the first panel and the single electronic display between the first mode of operation and the second mode of operation, wherein in the second mode of operation the vehicle information displayed on the single electronic display is inverted.

* * * * *